Dec. 28, 1948.　　　　A. M. YOUNG　　　　2,457,429
ROTARY WING AIRCRAFT

Filed May 9, 1945　　　　　　　　　　　　　2 Sheets-Sheet 1

INVENTOR
ARTHUR M. YOUNG
BY
Bean, Brooks, Buckley & Bean   ATTORNEYS

Dec. 28, 1948.    A. M. YOUNG    2,457,429
ROTARY WING AIRCRAFT
Filed May 9, 1945    2 Sheets-Sheet 2

INVENTOR
ARTHUR M. YOUNG
BY
Bean, Brooks, Buckley & Bean.    ATTORNEYS

Patented Dec. 28, 1948

2,457,429

UNITED STATES PATENT OFFICE 2,457,429

ROTARY WING AIRCRAFT

Arthur M. Young, Buffalo, N. Y., assignor to Bell Aircraft Corporation, Buffalo, N. Y.

Application May 9, 1945, Serial No. 592,823

8 Claims. (Cl. 170—160.26)

This invention relates to aircraft, and more particularly aircraft of rotary wing type and to improvements in rotor mechanisms therefor of the type such as disclosed in my issued U. S. Patent 2,256,918.

It is an object of the present invention to provide improvements in rotor blade mount and control systems of the general type disclosed in my aforesaid patent, whereby to prevent rotor blade "coning" effects from undesirably impressing varying torque forces upon the rotor blade pitch control system.

Another object of the invention is to provide an improved dual bladed rotor mounting and pitch control arrangement in rotative wing type aircraft.

Another object of the invention is to provide an improved rotor blade mount and control arrangement in "pre-coned" type rotor blade systems for rotative wing aircraft.

Another object of the invention is to provide an improved rotor blade mount and control arrangement for rotative wing type aircraft, for use in conjunction with either pre-coned blade arrangements or with flexible blade arrangements which inherently involve coning effects under flight conditions.

Other objects and advantage of the invention will appear from the specification hereinafter.

In the drawings:

Fig. 4 is a generalized diagrammatic view of a rotor in side elevation, illustrating the coning effect herein referred to.

The invention is illustrated in conjunction with a rotative wing aircraft rotor mount and control arrangement which is generally of the type disclosed in my issued Patent 2,256,918. That is, the arrangement comprises a pair of oppositely extending blades carried upon a central hub which is of such construction that the blades may turn individually about their long axes for what I term "pitch change" or vertical flight control, against relatively heavy bearing surfaces so as to successfully withstand the centrifugal forces incidental to rotor operation. The hub itself is pivotally mounted upon the upper end of the aircraft mast or drive shaft so as to be delicately balanced and freely pivotable to permit the blades and hub to rock freely as a unit about an axis extending generally longitudinally of the dual blade unit for what may be termed "feathering" of the rotor, for the purpose of tipping the vertical axis of the rotor. This operation procures differential changes in the blade angles of attack which in turn produce tilting of the virtual axis of the rotor for control of the horizontal flight of the aircraft. A primary object of the invention covered by my aforesaid Patent 2,256,918 was to functionally separate the mechanisms of rotor feathering and pitch change, while the present invention goes still further and provides for vertical separation of the axes of feathering and pitch change for the following purposes.

Figure 4:
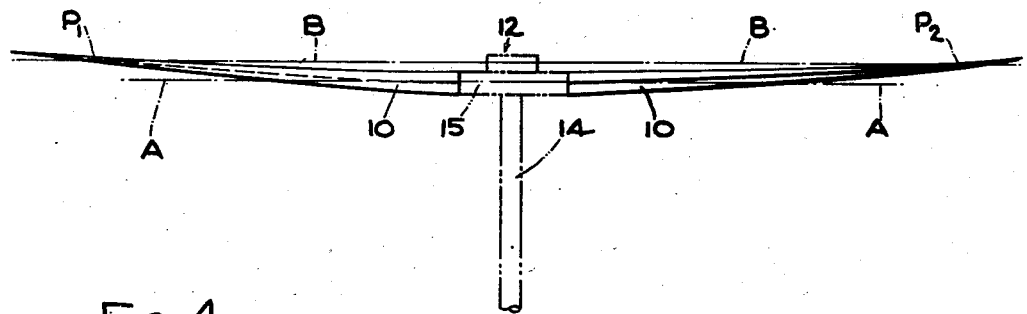

It is a characteristic of the type rotor referred to in my aforesaid patent that during flight operations the rotor blades cone (as illustrated in Fig. 4 herein) and that this coning effect in combination with torque forces of different degrees on the two blades of the rotor introduces undesirable forces into the rotor feathering control system. For illustration, Fig. 4 herein represents a rotor of which the blades are shown in a coned attitude and the rotor blade torque forces are assumed to be acting upon the blades as at centers $P_1$—$P_2$. Thus, it will be understood that whenever the torque forces on the two blades are unequal (and if the universal joint device of the rotor hub is centered on an axis as shown at A—A as in the case of my aforesaid patent) there will then be a couple around the axis A—A tending to rotate the rotor as a unit about an axis in the direction of extension of the blades, which will in turn throw a force into the feathering control system.

The present invention contemplates raising of the hub universal joint to an elevated level, as along the line B—B in Fig. 4 which may be defined as a line through the points $P_1$—$P_2$; and it will now be apparent that any difference in the torque forces at $P_1$—$P_2$ will not tend to rotate the hub because such force difference would have no lever arm. The center of mass of the rotor is thereby brought into coincidence with the center of pivotation of the rotor; and therefore the present invention distinguishes from arrangements such as shown in my aforesaid patent in that it contemplates that the pitch change and feathering axes be arranged in vertically offset relationship instead of in vertically coincident relationship, and also in that the "pitch change" type rotations of the rotor blades upon their mounts be controlled in different manner.

Figure 1:
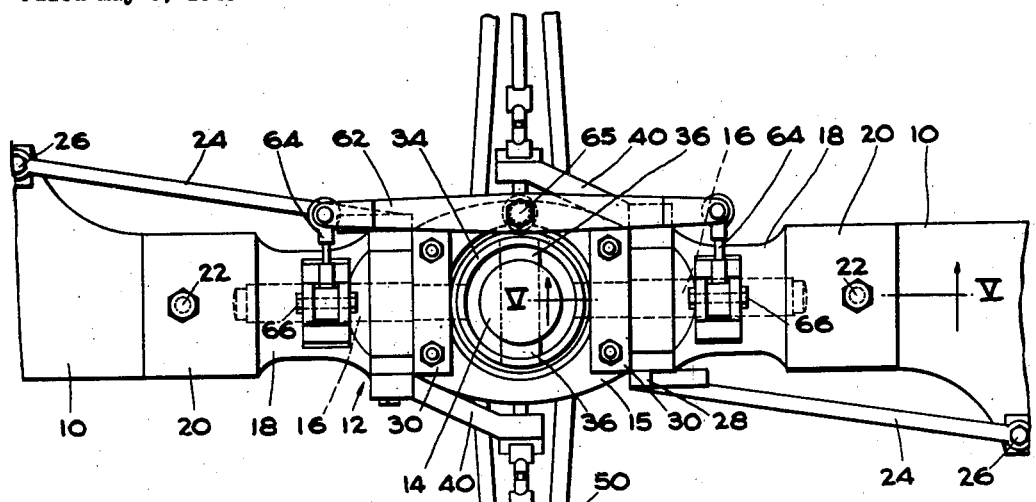
Fig. 1 is a fragmentary top plan of a rotor blade mount and control arrangement of the invention.
Figure 5:
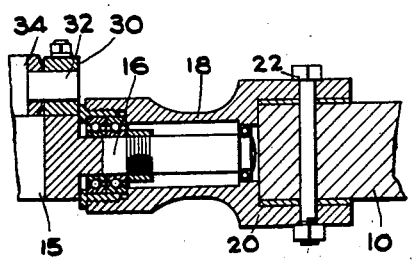
Fig. 5 is a fragmentary section as along line V—V of Fig. 1.
Figure 2:
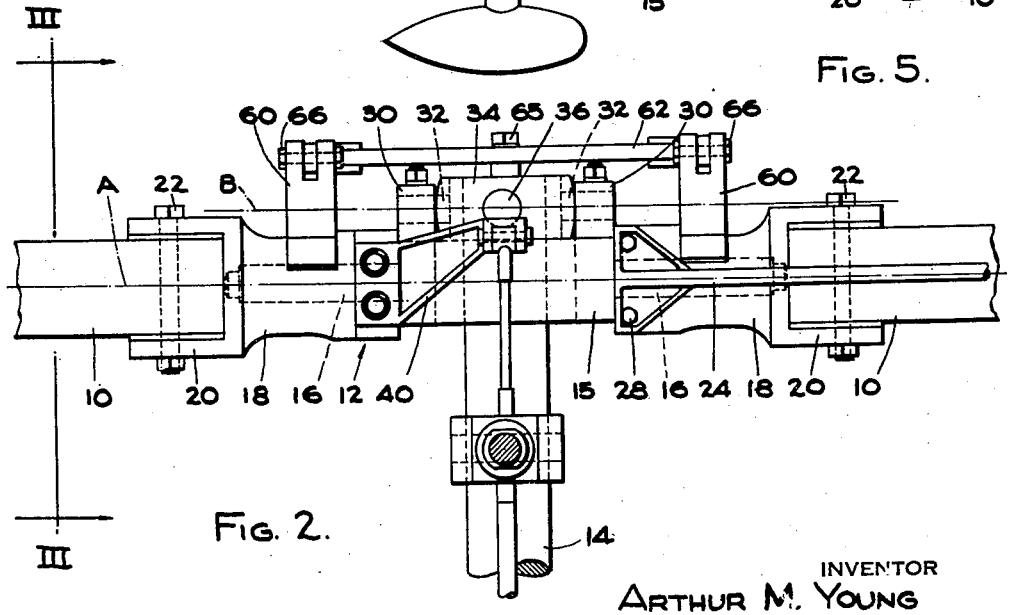
Fig. 2 is a side elevation of the mechanism of Fig. 1.

With the above stated objects and purposes in mind, the invention may be illustrated as in the accompanying drawing in conjunction with a pair of opposite'y extending rotor blades 10—10 which are carried by means of a novel hub as illustrated generally at 12 upon a rotating drive shaft or mast 14. The hub device 12 comprises a generally annular member 15 which encircles the drive shaft 14 in freely spaced relation therefrom and is pivotally mounted as by means of a pair of diametrically extending stub shaft and bearing devices 16—16 upon corresponding rotor blade yokes 18—18 so that the yokes 18—18 are free to rotate relative to the hub annulus 15 about aligned axes as indicated at A—A (Figs. 2 and 4) directed parallel to the direction of extension of said rotor blades. The yokes 18—18 are illustrated to terminate in clevis portions 20—20 which receive the rotor blade roots and connect thereto as by bolts 22—22. Diagonal struts 24—24 connect to the blades 10—10 through means of bolts 26 adjacent the trailing edges of the blades and to the blade yokes 18—18 as by connections at 28—28 to brace the blades relative to their root yokes and to provide the blades and yokes to be rotatable as units upon the hub bearings 16—16, while the centrifugal loads on the blades 10—10 are transmitted in apposition through the bearings 16—16 and the annular hub 15.

To provide the hub and blade assembly to be rotatable as a unit relative to the mast 14 about an axis extending in the direction of extension of the rotor blade unit, the hub 15 is provided with upstanding bearing blocks 30—39 which mount inwardly extending bearing pins 32—32 rotatably engaging within socketed portions of a ring 34 which also encircles the mast 14 in freely spaced relation the upper end of the mast 14. The ring 34 is disposed at an elevation above the annulus 15, and thus the rotor blade and hub unit is mounted upon the ring 34 so as to be "underslung" at B—B which is parallel to the axis A—A but sufficiently thereabove to cause the axis B—B to substantially coincide with the centers of drag of the blades.

The ring 34 is pivotally mounted upon the mast 14 as by means of axially aligned pivot pins 36—36, the axes of which extend in a horizontal direction at right angles to the direction of the axis B—B, whereby the ring 34 is mounted to be freely rotatable upon the mast 14 about an axis at right angles to the axis of rocking of the rotor blade unit relative to the ring 34. This provides the equivalent of a freely hinged or flapping type rotor system.

Thus, an arrangement is provided whereby in order to control the aircraft embodying the invention so as to alter the lift effects of the rotor, as in connection with climbing or descending flight operations, the rotor blades may be adjusted as to pitch relative to the hub annulus 15; while for feathering effects in order to procure horizontal flight control, the blade and hub assembly may be pivoted as a unit relative to the mast 14 through the universal joint type connection furnished by the pivot devices 32—36. It is of course contemplated that any suitable means for positionally adjusting the rotor blades and the rotor blade hub unit relative to the mast for the above stated purposes may be employed.

Figure 3:
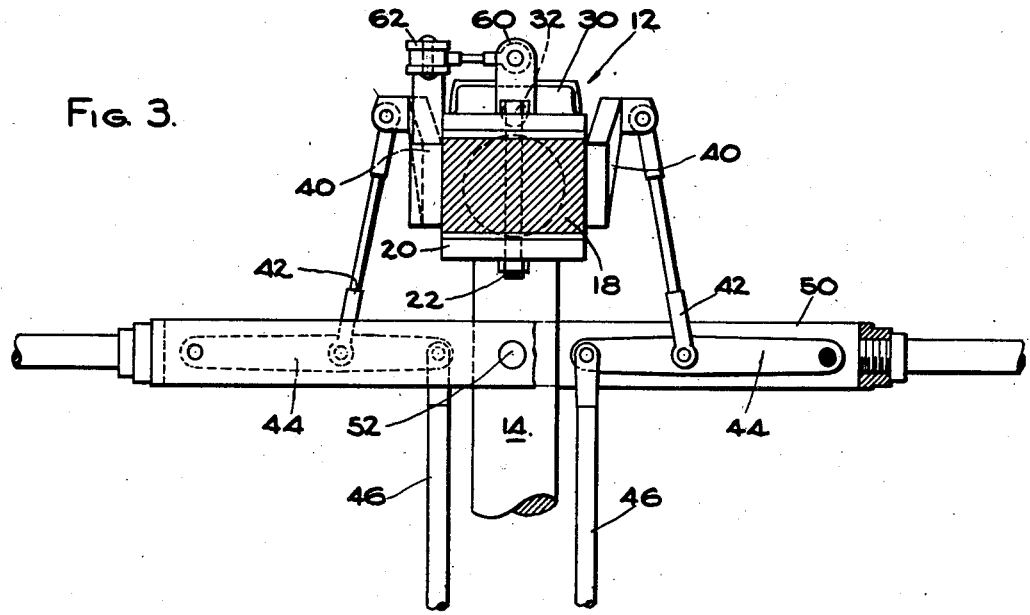
Fig. 3 is a section as along line III—III of Fig. 2.

For example, the rotor mechanism may be arranged to be controlled as in the case of my issued U. S. Patents 2,256,918 and 2,368,698 which disclose the use of a "swash-plate" device, or the like to be mounted to encircle the mast 14 while being vertically displaceable and universally inclinable relative thereto and connected to rotor blade pitch control crank arms such as are illustrated herein at 40—40 through a differential linkage system comprising struts 42, 44 and 46 carried upon opposite arms of a rotating inertia device as illustrated at 50. As explained in my aforesaid patents, such an inertia device may be pivotally mounted as at 52 herein (Fig. 3) upon the mast 14 so as to be caused to rotate therewith while being vertically rockable thereon about an axis extending parallel to the direction of the pitch change axes of the rotor blades and so connected to the rotor blade pitch control arms as to provide automatic stability of the aircraft while in flight. Also, as explained therein, simultaneous upward or downward displacements of the control for similar actuation of the links 46—46 will procure collective pitch change effects in the rotor blades for vertical ascent and descent control, while differential vertical displacements of the control links 46—46 will procure "feathering" or cyclic pitch change effects in the rotor blades for horizontal flight control purposes. In any case the inertia device 50 is free to function at all times independently of pilot imposed control forces to superpose cyclic pitch change effects upon the rotor blade pitch adjustment system for stability purposes as referred to hereinabove and as explained in more detail in my Patent No. 2,368,698. However, it is to be understood that control devices such as the swash plate and inertia means for superposed pilot control and inherent stability characteristics just referred to comprise no part of the present invention although it is particularly adapted to be employed in conjunction therewith; but that the present invention may be employed in conjunction with any other suitable manual or automatic control system.

In order to insure that the rotor blades 10—10 rotate simultaneously relative to the hub 15, a motion synchronizing mechanism is employed to interconnect corresponding horns 60—60 which are illustrated to extend substantially vertically from each of the blade brackets 18—18. As illustrated in the drawing, the sychronizing mechanism may comprise a rocker arm 62 centrally pivoted as at 65 upon the rotor hub 15 and pivotally connected at its opposite ends to short links 64—64 which in turn extend into corresponding pivotal connections at 66—66 with the upper ends of the horns 60—60. Thus, it will be understood that only coincidental pitch change positional adjustments of the rotor blades 10—10 relative to the hub 15 will be permitted and that such adjustments will always occure to equal degrees but in opposite directions. Without such a device to synchronize the blade pitch change motions there would be an undesirable freedom in the pitch control mechanism permitting the hub to get off center and out of balance relative to the mast by sidewise displacements of the hub. Such displacements would not be restrained by the control linkage alone because they would occur without changes of the blade angles (either in pitch or in feathering). It will of course be understood that any other suitable means for synchronizing the blade pitch motions may be employed, such as bevel gears; cables; vertically disposed levers, or the like. The pitch equalizer also has advantageous application to any rotor in which the blades feather themselves by aerodynamic action. For example, a rotor in which the blades are free to feather themselves by aerodynamic action such as in Bleecker Patent No.

1,819,863 is open to the objection that in transverse flow of air such as when the aircraft is moving horizontally, the blades tend to maintain equal angles with respect to the relative wind. Due to the difference in velocity of the incident wind against retreating and advancing blades, however, they do not maintain equal lifts even with the feathering action which the flapping hinge normally provides, as discussed in my issued Patent No. 2,082,674. Application of the pitch equalizer of the present invention to such a rotor prevents differential self-adjustment of the blades, and hence minimizes unbalancing effects upon the blades from transverse airflow. This is accomplished because the pitch equalizer controls the blades simultaneously in response to vertically directed airflow forces thereon while still leaving the cyclic control in the hands of the pilot.

It will also be understood that whenever the invention is used in conjunction with preconed type rotors the underslung hub further improves the rotor operation, and particularly the rotor starting operation because when the invention is employed the balance point of the rotor is placed close to or above the elevation of the mass of the blades. Without such placement of the rotor balance point it would be difficult to bring the rotor up to operative speed because the rotor would be dynamically unstable; having its mass at an elevation above its point of pivoting upon the aircraft.

Although only one form of the invention has been shown and described in detail it will be apparent to those skilled in the art that the invention is not so limited but that various changes may be made therein without departing from the spirit of the invention or the scope of the appended claims.

I claim:

1. In an aircraft of the rotary wing type the combination which comprises a support having a main axis, a rotor comprising a hub arranged to rotate about said main axis, a universal joint mounting for said hub relative to said axis, said joint defining transverse pivot axes, two blades extending in opposite radial directions from said hub in a plane perpendicular to said main axis and below the plane of said transverse pivot axes, means rotatably journalling said blades upon said hub, means for rocking said hub and blades as a unit about one of said pivot axes for feathering of said rotor, and means for individually rotating said blades upon their journalling means with respect to said hub for blade pitch changes.

2. In a rotor, the combination which comprises, a support having a main axis, a hub arranged to rotate about said main axis, a universal joint mounting for said hub on said axis, two blades extending in opposite radial directions from said hub in a plane perpendicular to said main axis and rotatably journalled in said hub for pitch change adjustments about axes disposed below the elevation of the axes of rotation of said universal joint device, means for rocking said hub and blades as a unit about the lengths of said blades for feathering, and means for individually rotating said blades about their lengths with respect to said hub for pitch change.

3. In an aircraft of the rotary wing type the combination which comprises a support having a main axis, a rotor comprising a hub arranged to rotate about said main axis, a universal joint mounting for said hub relative to said axis, said joint defining transverse pivot axes, two blades extending in opposite radial directions from said hub in a plane perpendicular to said main axis, means rotatably journalling said blades upon said hub, means for rocking said hub and blades as a unit about one of said pivot axes for feathering of said rotor, means for individually rotating said blades upon their journalling means with respect to said hub for blade pitch changes, and means carried solely by the hub and movable bodily therewith and interconnecting said hub and said blades for causing said blades to rotate by equal increments with respect to said hub.

4. In an aircraft of the rotary wing type the combination which comprises a body, a support having a main axis mounted on said body, a hub arranged to rotate about said main axis, a universal joint mounting for said hub on said axis, a source of power mounted in said body and connected to deliver torque to rotate said hub, two blades extending in opposite radial directions from said hub in a plane perpendicular to said main axis and rotatably journalled in said hub for pitch change adjustments, means for rocking said hub and blades as a unit about the lengths of said blades for feathering, means for individually rotating said blades about their lengths with respect to said hub for pitch change, and means carried solely by the hub and movable bodily therewith and interconnecting said blades for equalizing pitch change motions thereof with respect to said hub.

5. An aircraft sustaining rotor assembly which comprises a support defining a principal axis, a universal joint mounted to rotate on said support, a liftscrew mounted on said universal joint to rotate about said support in a plane normally perpendicular to said principal axis but freely inclinable in any direction therefrom, said liftscrew comprising a hub and two blades extending in opposite directions from said hub in a plane disposed below the plane of said universal joint, means for constraining said two blades to execute cyclic changes of angle of attack together as a unit about an axis in said blades in synchronism with the rotation of the liftscrew, and means for adjusting at will and controlling the magnitudes of said changes of angle.

6. An aircraft sustaining rotor assembly which comprises a support defining a principal axis, a universal joint mounted to rotate on said support, a liftscrew mounted on said universal joint to rotate about said support in a plane normally perpendicular to said principal axis but freely inclinable in any direction therefrom, said liftscrew comprising a hub and two blades extending in opposite directions from said hub in a plane disposed below the plane of said universal joint, means interconnecting said two blades for constraining said two blades to execute cyclic changes of angle of attack together as a unit about an axis in said blades in synchronism with the rotation of the liftscrew and for equalizing pitch change motions of said two blades, and means for adjusting at will and controlling the magnitudes of said changes of angle and for separately altering the blade angles in like amounts for pitch change.

7. In an aircraft of the rotary wing type, a body, a rotor support extending from said body in fixed relation thereto, a rotor comprising a hub mounted upon said support to rotate thereon and for universal inclination thereon about transverse axes defining a plane intersecting said hub, and rotor blades rooted upon said hub below the elevation of said plane and extending radially from said hub.

8. In an aircraft of the rotary wing type, a rotary wing comprising a hub, means mounting said hub upon the aircraft permitting universal tilting of said hub relative to the aircraft, rotor blades mounted upon said hub to be adjustable relative to the hub for pitch change purposes, control means, means connecting said control means to each of said rotor blades for feathering and collective pitch adjustments of said blades in response to manipulation of said control means, and means interconnecting said hub and said blades constructed and arranged to suppress blade movements with respect to said hub except equal pitch changing movements of said blades in the same sense of pitch change angle with respect to said hub.

ARTHUR M. YOUNG.

REFERENCES CITED

The following references are of record in the file of this patent:

UNITED STATES PATENTS

| Number | Name | Date |
|---|---|---|
| 2,023,105 | Smith | Dec. 3, 1935 |
| 2,156,334 | Bothezat | May 2, 1939 |
| 2,256,918 | Young | Sept. 23, 1941 |
| 2,352,404 | Pitcairn | June 27, 1944 |
| 2,369,048 | Hays | Feb. 6, 1945 |

FOREIGN PATENTS

| Number | Country | Date |
|---|---|---|
| 767,068 | France | Apr. 23, 1934 |